2,832,327
Patented Apr. 29, 1958

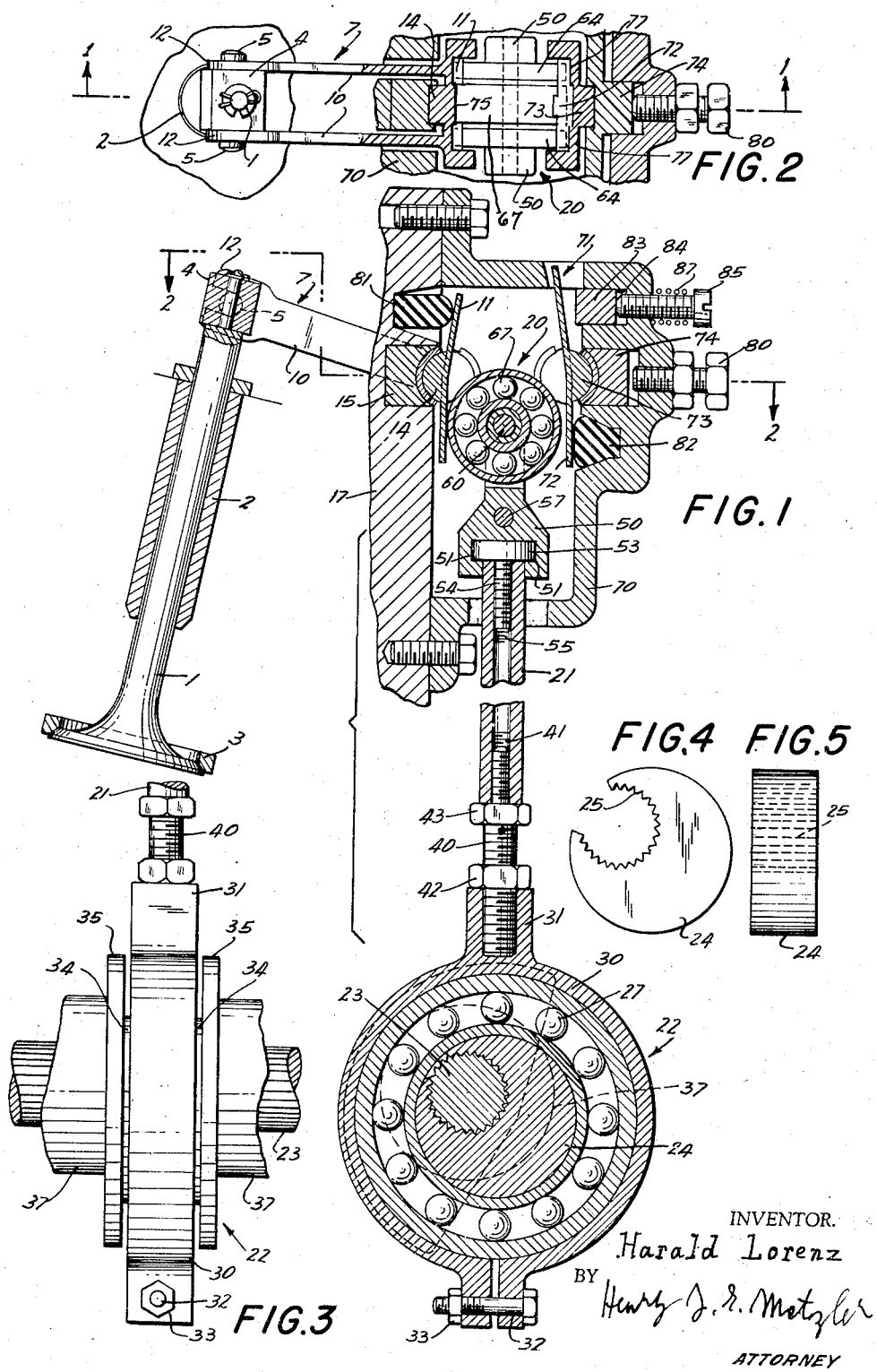

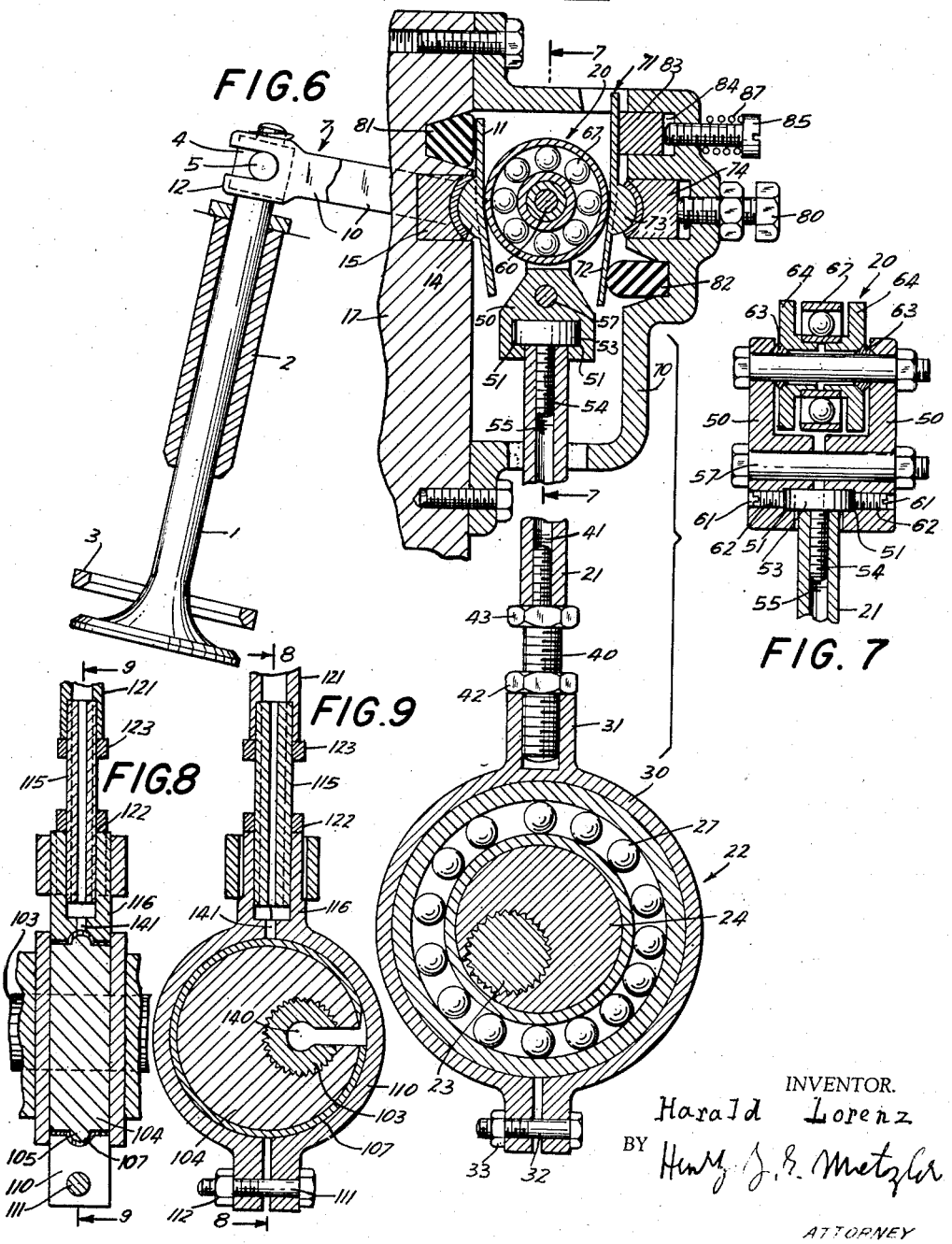

2,832,327

MECHANICALLY OPERATED SPRINGLESS CIRCULAR ECCENTRIC VALVE GEAR

Harald Lorenz, New York, N. Y.

Application November 13, 1956, Serial No. 621,909

4 Claims. (Cl. 123—90)

The present invention relates to improvements in valve gears and valve actuating mechanisms for internal combustion engines, steam engines, compressors and for any other devices and machines using valves which are opened and closed at predetermined intervals automatically by the operation of the machine, or by any other suitable means.

Although the use of my new and improved valve gear is not limited to internal combustion engines I have used, as example for herein describing and illustrating my invention, a valve arrangement for an internal combustion engine. In order to attain a high efficiency of an internal combustion engine, the intake valves as well as the exhaust valves should be fully open for as long as possible a period of time during the intake stroke and the exhaust stroke respectively. If a circular eccentric directly actuates a valve, the valve is fully open only during a small fraction of each stroke. Even the usually used cams, which are shaped in such a manner as to increase the time of a wide valve opening as much as possible, cannot be provided with steep sliding surfaces because the high speed of modern engines, and the limitations imposed upon the pressure of the valve springs for practical reasons, may cause an unwanted jumping motion of the valve or too much lateral pressure of the cams upon the shafts or tappets of the valves. Therefore, one object of the present invention is the provision of a device of the character described which allows the use of one circular eccentric for the operation of each valve and which also will reduce to a minimum the gradual opening and closing time of each valve, and will cause the valve to assume its maximum open position during the longest possible period of time at each one of those strokes which demands an opening of the valve.

Another object of the present invention is the provision of a device of the character described which does not require any valve springs thus greatly reducing the weight, the cost, the valve operating force and consequently the wear and tear, the possibility of breakdowns, and the necessity of repairs and adjustment of the valve gear, and making it possible to avoid valve tappet noises.

A further object of the present invention is the provision of a device of the character described which is constructed in such a manner as to avoid expensive forging and grinding of a cam shaft, but which allows all parts of the valve gear to be manufactured inexpensively by mass production processes such as pressing, casting or the like and to use primarily materials which are inexpensive or easy to work such as light metal, plastic materials, or the like.

Yet still another object of the present invention is the provision of a device of the character described which can be assembled easily and quickly, and also can be dismantled easily and quickly for overhauling purposes, and which is constructed in such a manner that all moving parts are well lubricated during the operation of the machine.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawings a preferred form of the invention has been shown.

In said drawings:

Figure 1 is a fractional vertical longitudinal sectional view of a preferred embodiment of my invention on the line 1—1 of Fig. 2;

Fig. 2 is a fractional horizontal sectional view on the line 2—2 of Fig. 1;

Fig. 3 is a fractional side view;

Fig. 4 is a detailed plan view of an eccentric disk;

Fig. 5 is a side view of the eccentric disk of Fig. 4;

Fig. 6 is a view like Fig. 1 showing the moving parts in different positions;

Fig. 7 is a detailed fractional sectional view of a roller on the line 7—7 of Fig. 6;

Fig. 8 is a fractional sectional view of a modified eccentric arrangement on the line 8—8 of Fig. 9;

Fig. 9 is a fractional sectional view on the line 9—9 of Fig. 8; and,

Fig. 10 is a diagram illustrating the timing of a valve movement.

Similar reference characters refer to similar parts throughout the several views.

In the drawings the numeral 1 denotes a valve which is slidable in a valve guide 2, and which engages a valve seat 3. To the upper end of the shaft portion of the valve 1 is attached a cross head member 4, from which extend pin portions 5. The valve 1 is actuated by means of a rocker 7, which has a pair of parallel arm portions 10 extended from a slightly V-shaped base portion 11. Each arm portion 10 has a bifurcated section 12 that engages one of the pin portions 5. Thus, while the rocker 7 is tilted from the position shown in Fig. 1 to that in Fig. 6, the valve 1 is being opened. When the rocker 7 is tilted from the position shown in Fig. 6 to that of Fig. 1 the valve 1 is being closed. The base portion 11 of the rocker 7 has a substantially semi-circular section 14, which rests upon a bearing member 15 in an engine wall portion 17. The rocker 7 is being tilted by means of a reciprocating roller member 20, which is connected by a lengthwise adjustable rod 21 to an eccentric arrangement 22 (Figs. 1, 3 and 6). In place of an expensive cam shaft, according to the present invention there can be used a simple shaft 23, which preferably has a longitudinally grooved surface. For each valve there is placed a disk 24, having an eccentric, longitudinally grooved hole 25 (Figs. 4 and 5), upon the shaft 23, and a bearing 27, which preferably is a ball bearing or a roller bearing, encompasses each disk 24. A ring member 30, which has an internally threaded flange portion 31, is securely fastened to the outer race ring of the bearing 27, and is tightened thereon by means of a screw 32 and a nut 33 or the like. A spacing washer 34 (Fig. 3), which has an eccentric hole like the disk 24 preferably is placed on the shaft 23 at each side of the disk 24, and counterweight plates 35 are also placed on the shaft 23 intermediate each washer 34 and a tubular spacing member 37. The spacing members 37, which have centrally located and internally longitudinally grooved bores, will keep the various eccentric arrangements 22 on the shaft 23 properly in spaced relation to each other for each valve unit. The smooth outer surfaces of the spacing members 37 can be used as bearing surfaces for the entire valve actuating shaft 23. Thus, if any suitable screw or nut arrangement (not shown) is provided at the ends of the shaft 23, all the parts 24, 27, 30, 34, 35 and 37 can be easily and quickly assembled on, or removed from, the shaft 23 for assembling, repairing, or exchanging said parts.

A threaded bolt 40 is screwed into the flange portion 31 of the member 30 as well as into an internally threaded portion 41 of the rod 21, and is secured thereon by means of nuts 42 and 43.

The roller member 20 preferably consists of a pair of bracket members 50, which in their lower portions have grooved sections 51 that engage a head portion 53 of a threaded bolt 54, which is screwed into an upper threaded bore portion 55 of the rod 21. The members 50 are joined to each other by means of a pair of bolts 57 and 60, and have opposite threaded bores 61 (Fig. 7) into which are screwed set screws 62. The set screws 62 press from opposite sides upon the head 53 and are adapted for properly spacing from each other the members 50. A pair of double taper rings 63 (Fig. 7) on the shaft portion of the bolt 60 are interposed between the inner sides of the members 50 and a pair of pulleys 64. A ball bearing 67, or a roller bearing, is interposed between the pulleys 64. The roller member 20 is being moved up and down in a housing 70 by means of the rod 21 and the eccentric arrangement 22 when the shaft 23 revolves. Opposite the rocker 7 there is provided in the housing 70 an adjustable cradle member 71, which has a slightly V-shaped base portion 72 and a substantially semi-circular bearing portion 73, that is movable in a bearing member 74. The roller member 20 is located between the members 7 and 71. The base portion 11 of the member 7 has a raised section 75 (Fig. 2) adjacent the bearing 67, which is engaged by the outer ring of the bearing 67. The member 71 has a pair of raised sections 77 adjacent the pulleys 64, which are engaged only by the pulleys 64 and not by the bearing 67. When the roller member 20 reciprocates between the members 7 and 71, the pulleys 64 rotate in a different direction as the bearing 67. Thereby the friction is reduced to a minimum by the outer ring of the bearing 67 engaging only the section 75 of the member 7, whereas the pulleys 64 engage only the sections 77 of the member 71.

The pressure of the opposite bearing members 15 and 74 upon the member 20 can be regulated by means of a set screw 80, which is screwed through the housing 70, and which presses upon the movable bearing member 74. Cushion members 81 and 82 of rubber or the like are provided in the engine wall 17 and in the housing 70 respectively, and a block 83 of fiber or plastic material or the like is slidably inserted into a bore 84 in the housing 70. A set screw 85, which preferably is provided with a brake spring 87, adjusts the distance at which the block 83 extends into the housing 70 and thus limits the rocking movements of the cradle member 71. While the member 20 is being moved up and down it will cause a rocking of the member 7, and thus will open and close the valve 1. Thereby the member 71 also will carry out a rocking movement, and the movement of the members 7 and 71 can be adjusted by manipulation of the screw 85. At the end of each rocking movement one of the members 7 or 71—more specifically the portions 11 or 72 thereof—will depress one of the cushion members 81 or 82, for cushioning the end of each movement.

In Fig. 10 I have shown a diagram illustrating the timing of a valve. The full line 90 shows the movement of a valve actuated by my new and improved mechanically operated springless circular eccentric valve gear, while the dash-and-dotted line 91 shows the movement of a valve actuated by an ordinary cam shaft. It will be seen from this diagram that the valve remains fully open from a point 92 to a point 93 when actuated by means of my device, whereas the valve is fully open only at the point 94 when actuated in the customary manner.

According to the modification of Figs. 8 and 9, a shaft 103, which is of the same construction and arrangement as the shaft 23 of Figs. 1, 3 and 6, is eccentrically extended through a disk 104 which has at its periphery an annular rib 105. A bearing bushing 107 of lead, bronze or the like is interposed between the disk 104 and a ring member 110, which is tightened around the parts 104 and 107 by means of a screw 111 and a nut 112 or the like. An externally threaded hollow bolt 115 is screwed with one end into a flange portion 116 of the member 110 and with its other end into an externally threaded lower portion of a tubular rod 121. The upper portion of the rod 121 is connected to a roller member (not shown) which is the same as that denominated by the numeral 20 in Figs. 1, 2, 6 and 7. Nuts 122 and 123 keep the parts 115, 116 and 121 securely in properly adjusted positions. In this case the bearing bushing 107 is substituted for the bearing 27 of Figs. 1 and 6. Lubricating channels 140 and 141, as well as any other suitable lubricating devices are provided on proper places and parts of the device.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A mechanically operated springless circular eccentric valve gear comprising a valve actuating shaft, a circular eccentric for each valve mounted on said shaft, a rocker member constructed and arranged for moving a valve, and means for connecting said eccentric to said rocker member being interposed between the rocker member and the eccentric.

2. In a machine having valves, a mechanically operated springless circular eccentric valve gear comprising a valve actuating shaft, a circular eccentric for each valve mounted on said shaft, a rocker member having a curved base portion being tiltably mounted on said machine for each valve thereof and being constructed and arranged for opening and closing the valve, a tiltable cradle member having a curved base portion opposite each rocker member, a roller member interposed between the base portions of said rocker member and said cradle member being connected to said eccentric so as to be reciprocated between said rocker and cradle members by the rotation of said eccentric thereby causing said rocker member to move said valve.

3. A device of the character described comprising a shaft rotatably mounted on a machine having valves, a circular eccentric for each valve mounted on said shaft, a rocker member having a curved base portion being tiltably mounted on said machine for each valve thereof and being constructed and arranged for opening and closing the valve, a tiltable cradle member having a curved base portion opposite each rocker member, means for adjustably limiting the tilting movement of said cradle member being provided on said machine, a roller member interposed between the base portions of said rocker member and said cradle member, and means for connecting said eccentric to said roller member being interposed between the roller member and the eccentric, so as to reciprocate said roller member between said rocker and cradle members by the rotation of said eccentric thereby causing said rocker member to move said valve.

4. In a machine having valves, a mechanically operated springless circular eccentric valve gear comprising a valve actuating shaft, a circular eccentric for each valve mounted on said shaft, a ring member rotatably mounted on said eccentric, a rocker member having a V-shaped base portion being tiltably mounted on said machine for each valve thereof and having an arm portion pivoted to the valve, a tiltable cradle member having a V-shaped base portion opposite each rocker member, means for adjustably limiting the tilting movement of said cradle member being provided on said machine, a roller member interposed between the base portions of said rocker member and said cradle member, and means for connecting said ring member to said roller member.

References Cited in the file of this patent

UNITED STATES PATENTS 1,885,323   Duryea _____ Nov. 1, 1932

FOREIGN PATENTS 65,022   Germany _____ Oct. 26, 1892